No. 821,618. PATENTED MAY 29, 1906.
E. I. DODDS.
OPERATING MECHANISM FOR CAR BRAKES.
APPLICATION FILED SEPT. 18, 1905.
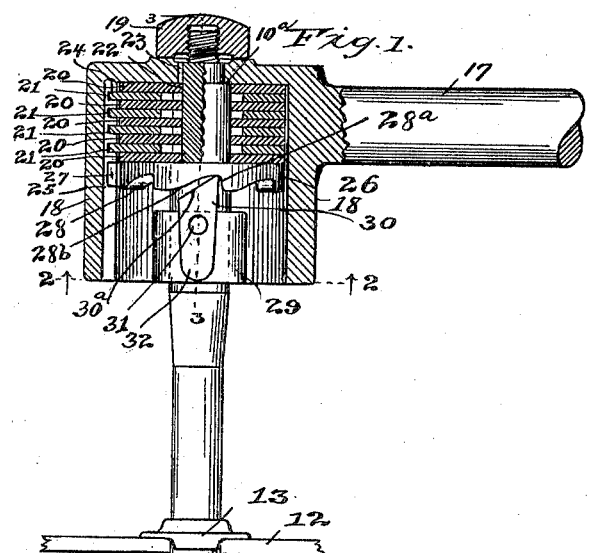
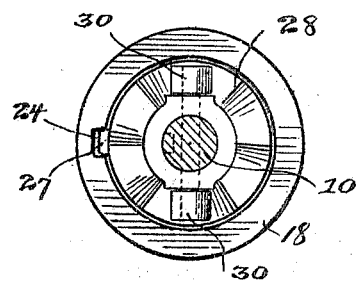
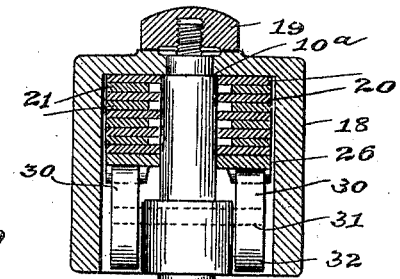
Witnesses,
Inventor,
Ethan I. Dodds
By Offield, Towle & Linthicum
Att'ys

UNITED STATES PATENT OFFICE.

ETHAN I. DODDS, OF PULLMAN, ILLINOIS, ASSIGNOR TO THE PULLMAN COMPANY, OF CHICAGO, ILLINOIS, A CORPORATION OF ILLINOIS.

OPERATING MECHANISM FOR CAR-BRAKES.

No. 821,618.　　　Specification of Letters Patent.　　　Patented May 29, 1906.

Application filed September 18, 1905. Serial No. 278,931.

*To all whom it may concern:*

Be it known that I, ETHAN I. DODDS, a citizen of the United States, residing at Pullman, in the county of Cook and State of Illinois, have invented certain new and useful Improvements in Operating Mechanisms for Car-Brakes, of which the following is a specification.

My invention relates to operating devices for car-brakes, and has for its object to provide a compact, simple, and easily-operated clutch mechanism between the brake handle or arm and the brake-shaft of a railway-car, such mechanism serving to operatively connect said parts on the forward or advance movement of the handle and automatically disengaging them on the return or backward movement of the handle.

To this end my invention comprises a plurality of friction means between the handle and shaft in conjunction with a novel mechanism for forcing the friction means together, such mechanism consisting, essentially, of a compression member carried by the handle and slidable on the shaft and a thrust member pivotally mounted on the shaft and cooperating with said compression member when the handle is turned forwardly to force said compression member against said friction means.

In the accompanying drawings I have illustrated a preferred mechanical embodiment of my invention, wherein—

Figure 1 is a partial elevation and partial section of a brake-shaft and handle equipped with my improved operating mechanism. Fig. 2 is a cross-section of the device shown in Fig. 1 on the line 2 2 of the latter figure as viewed in the direction indicated by the arrows; and Fig. 3 is a cross-section of the brake mechanism shown in Fig. 1 on the line 3 3 of the latter figure, a part of the internal mechanism appearing in elevation.

10 designates the brake-shaft, passing through the floor or platform 11 of the car and having a bearing therein, its upper portion being rotatably supported by a brace 12, carrying a bearing 13. Below the floor 11 the shaft 10 is provided with the usual chain 14, which by winding around the end of the shaft actuates the brake-shoes. Just above the floor 11 there is provided the usual ratchet 15, fixed to the shaft 10, and the cooperating pawl 16. My invention particularly concerns the clutch mechanism between the handle and the shaft and comprises a handle 17, rotatably mounted on the upper end of shaft 10 and having a depending skirt or casing 18, housing the clutch mechanism hereinafter described. A nut 19, screwed on the upper end of shaft 10, holds the handle on the shaft against a shoulder 10$^a$ on the latter. Within the casing 18 is a plurality of friction-disks 20 and 21, the alternate disks 20 being secured to shaft 10 by keys 22, engaging a keyway 23 in the shaft. The alternate disks 21 have each an outwardly-extending peripheral key 24, which fits in a longitudinal keyway 25 on the inner wall of casing 18. It will be evident from this construction that the disks 20 turn with the shaft 10 and the disks 21 turn with the handle 17. Below this series of disks there is mounted loosely on the shaft a compression collar or disk 26, which has a peripheral key 27, similar to the keys 24, fitting in the slot 25 of the casing 18, so that as the casing is turned by means of the handle 17 the compression member also rotates. The under surface of the compression-collar is formed with an annular series of notches 28, each of which has an abrupt approximately vertical side 28$^a$ and a longer inclined side 28$^b$. Below the collar 26 there is mounted on the shaft 10 a hub 29, which has pivoted to it a pair of thrust members 20, said thrust members, as herein shown, having the form of substantially upright fingers, the upper ends of which have a pivoted or inclined upper edge 30$^a$, while their lower portions below the pivot are made of greater weight than their upper portions, so that said fingers normally tend to swing to the vertical position shown. A pair of these fingers are mounted on opposite sides of the hub by means of a pivot-pin 31, that passes through the shaft and hub, so that said fingers can turn freely on their pivots, but are held against movement longitudinally of the shaft.

In the operation of the device as the handle 17 is grasped and turned in a clockwise direction the compression-disk 26 also rotates, and the abrupt sides 28$^a$ of two of the notches 28 engage the adjacent longer edges of the pivoted thrust-fingers at their upper end, and as the parts continue to rotate the fingers 30 turn on their pivots and as they approach the vertical position force the compression member 26 against the disks under a toggle-like action, so that the latter are pressed together, thus securing operative frictional connection between the handle 7 and shaft 10, whereby the rotary movement of the former is imparted to the latter. As the handle continues to be moved in this direction the chain 14 is wound to some extent around the shaft, thus applying the brakes. In order to then secure another grip upon the shaft with the handle in a more favorable position for action, the handle is turned backward or counter-clockwise, during which movement the long inclined sides $28^b$ of the notches of the compression-disk ride idly over the inclined upper edges $30^a$ of the thrust-fingers, tilting the latter to some extent on their pivots. When the handle is again moved forwardly, it secures another frictional engagement with the shaft 10 in the manner above described, and the chain 14 is still further wound around the shaft. The ratchet 15 and pawl 16 operate either manually or automatically to prevent backward turning of the shaft during the reverse movement of the handle.

This patent is intended to embrace only so much of the disclosure made herein as is covered by the claims.

I claim—

1. In a device of the character described, the combination with a shaft and a handle mounted thereon, of coöperating friction devices carried by said shaft and handle, respectively, a compressing member mounted on and slidable longitudinally of said shaft, and a thrust member pivotally mounted on said shaft and coöperating with said compression member when the handle is turned forwardly to force said friction devices into operative engagement through said compression member, substantially as described.

2. In a device of the character described, the combination with a shaft and a handle mounted thereon, of coöperating friction-disks carried by said shaft and handle, respectively, a compression-disk mounted on and slidable longitudinally of said shaft, and a thrust member pivotally mounted on said shaft and engaged by said compression-disk when the handle is turned forwardly in a manner to force said friction-disks into operative engagement through said compression-disk, substantially as described.

3. In a device of the character described, the combination with a shaft and a handle mounted thereon, of coöperating friction-disks carried by said shaft and handle, respectively, a compression-disk mounted on and slidable longitudinally of said shaft, and one or more counterweighted fingers pivotally mounted on said shaft and engaged at one end by said compression-disk when the handle is turned forwardly in a manner to force said friction-disks into operative engagement through said compression member, substantially as described.

4. In a device of the character described, the combination with a shaft and a handle mounted thereon, of coöperating friction-disks carried by said shaft and handle, respectively, a compression-disk mounted on and slidable longitudinally of said shaft and having a notched surface, and one or more counterweighted fingers pivotally mounted on said shaft and having pointed ends engaged by the notches of said compression-disk when the handle is turned forwardly in a manner to turn said fingers toward a position parallel with the shaft and thereby force said compression member upon said friction-disks, substantially as described.

5. In a device of the character described, the combination with a shaft and a handle mounted thereon having a depending casing, of coöperating friction-disks within said casing, alternate disks being non-rotatable relatively to the casing and shaft, respectively, a compression-disk mounted on and slidable longitudinally of said shaft and non-rotatable relatively to said casing, said compression-disk having a notched lower surface, and one or more counterweighted fingers pivotally mounted on said shaft beneath said compression-disk, said fingers having inclined upper ends operatively engaging the notches of said compression-disk when the handle is turned forwardly and idly engaging said notches when the handle is turned backwardly, substantially as described.

ETHAN I. DODDS.

Witnesses:
WALTER M. FULLER,
FREDERICK C. GOODWIN.